(12) United States Patent
Azizi

(10) Patent No.: US 9,199,147 B2
(45) Date of Patent: Dec. 1, 2015

(54) GOLF BAG CART

(71) Applicant: Yama Azizi, Antioch, CA (US)

(72) Inventor: Yama Azizi, Antioch, CA (US)

( * ) Notice: Subject to any disclaimer, the term of this patent is extended or adjusted under 35 U.S.C. 154(b) by 0 days.

(21) Appl. No.: 14/279,133

(22) Filed: May 15, 2014

(65) Prior Publication Data

US 2015/0014076 A1    Jan. 15, 2015

Related U.S. Application Data

(60) Provisional application No. 61/823,600, filed on May 15, 2013.

(51) Int. Cl.
| | |
|---|---|
| *B62B 3/10* | (2006.01) |
| *A63B 55/08* | (2006.01) |
| *B62B 3/00* | (2006.01) |
| *B62B 3/08* | (2006.01) |
| *A63B 55/00* | (2015.01) |
| *A63B 71/06* | (2006.01) |

(52) U.S. Cl.
CPC ............... *A63B 55/08* (2013.01); *A63B 55/087* (2013.01); *B62B 3/001* (2013.01); *B62B 3/08* (2013.01); *B62B 3/102* (2013.01); *A63B 55/00* (2013.01); *A63B 2055/001* (2013.01); *A63B 2055/081* (2013.01); *A63B 2071/0625* (2013.01); *A63B 2208/0204* (2013.01); *A63B 2210/50* (2013.01); *A63B 2220/12* (2013.01); *A63B 2220/806* (2013.01); *A63B 2220/807* (2013.01)

(58) Field of Classification Search
CPC ...... B62D 51/02; B62K 3/002; B60P 3/0257; B60P 3/007; A63B 2055/001; A63B 55/08; A63B 55/087; B62B 3/001; B62B 3/08; B62B 3/102
USPC ....................................... 180/65.1, 19.2, 19.3
See application file for complete search history.

(56) References Cited

U.S. PATENT DOCUMENTS

| | | | | |
|---|---|---|---|---|
| 3,648,795 | A * | 3/1972 | Moulton | 180/216 |
| 6,907,949 | B1 * | 6/2005 | Wang | 180/65.51 |
| 2004/0262871 | A1 * | 12/2004 | Schreuder et al. | 280/87.1 |
| 2008/0024298 | A1 * | 1/2008 | Keays | 340/568.6 |
| 2011/0230986 | A1 * | 9/2011 | Lafortune et al. | 700/93 |
| 2012/0205170 | A1 * | 8/2012 | Adams | 180/55 |

* cited by examiner

*Primary Examiner* — Brodie Follman
*Assistant Examiner* — Brian Cassidy
(74) *Attorney, Agent, or Firm* — West & Associates, A PC; Stuart J. West; Shaun N. Sluman

(57) ABSTRACT

A golf bag cart comprising a wheeled drive section and a storage section configured to house one or more golf clubs. In some embodiments the golf bag cart's storage section can be flipped up from a closed position against the drive section to an open position extended away from the drive section, such that the golf bag cart can be driven around in the open position by a user. The golf bag cart can have one or more steering mechanisms configured to direct the golf bag cart as the golf bag cart is driven.

18 Claims, 7 Drawing Sheets

GOLF BAG CART

CLAIM OF PRIORITY

This Application claims priority under 35 U.S.C. §119(e) from earlier filed U.S. Provisional Application Ser. No. 61/823,600, filed May 15, 2013, by Yama Azizi, the entirety of which is incorporated herein by reference.

FIELD OF THE INVENTION

The present disclosure relates to golf bags and carts, particularly a golf bag cart comprising a storage section and a wheeled drive section.

BACKGROUND

Golfers often store and transport golf clubs and other equipment in a golf bag. A golf bag is commonly loaded with a set of golf clubs, including woods and irons of varying loft in addition to a putter. In addition, a golf bag is also commonly loaded with golf balls, gloves, tees, and other types of golfing equipment, clothing, and/or accessories.

While playing a round of golf at a golf course, golfers routinely transport loaded golf bags around the course so that any equipment they may desire to use during the round of golf is close at hand. For instance, a golfer can transport a golf bag along a golf course so that the golfer can select a driver from his or her golf bag when at a tee, an iron while on a fairway, and a putter when on the green. Although transporting a large amount of golf clubs and other equipment is common and can be needed to properly play a round of golf, in many cases manually carrying or rolling a heavy and bulky golf bag around a golf course can detract from the enjoyment of a golfing experience.

One common solution has been to mount a golfer's golf bag on a conventional motorized golf cart that can be driven around a golf course. However, conventional golf carts are often shared by two or more golfers who may hit their balls to different locations on the course. This can require that the golf cart take extra time to drive to each ball location, rather than having each golfer separately go to the location of his or her ball. In some cases, golf carts are restricted to designated cart paths, and a golfer must manually transport his or her golf bag to the ball's location from the golf cart on the cart path, or select a desired golf club from the golf bag on the golf cart and then walk to ball's location from the cart path. Additionally, because most golf carts are large vehicles that cannot be easily transported long distances, in most situations a golfer may be required to rent a new golf cart at each course the golfer visits.

What is needed is a golf bag cart that can be substantially the same size as a conventional golf bag and have a similar storage capacity, but be capable of being ridden around a golf course in a manner similar to that of a golf cart. The golf bag cart should have a storage section that can fold down or be removable when it is stored or transported, but that can fold up from or be attached to a wheeled drive section when a golfer uses it on a golf course. The golfer should be able to drive the motorized golf bag cart around the course, and retrieve golf clubs from the storage section when needed.

DETAILED DESCRIPTION

Figure 1A:
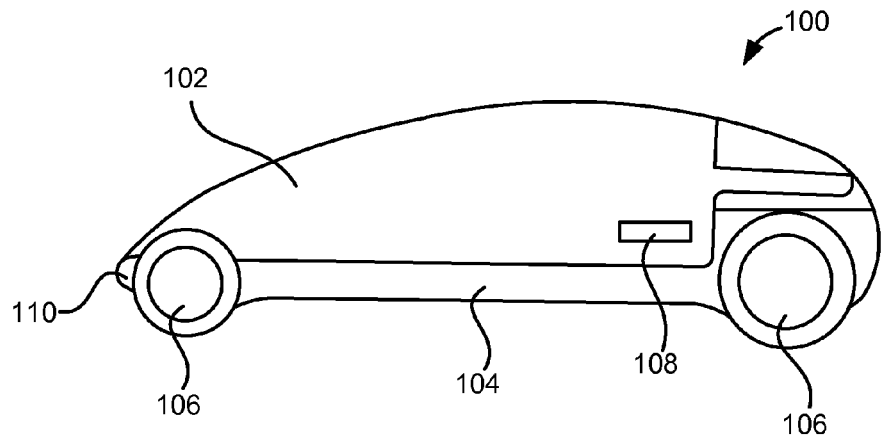
FIG. 1A depicts an exemplary embodiment of a golf bag cart in a closed configuration.
Figure 1B:
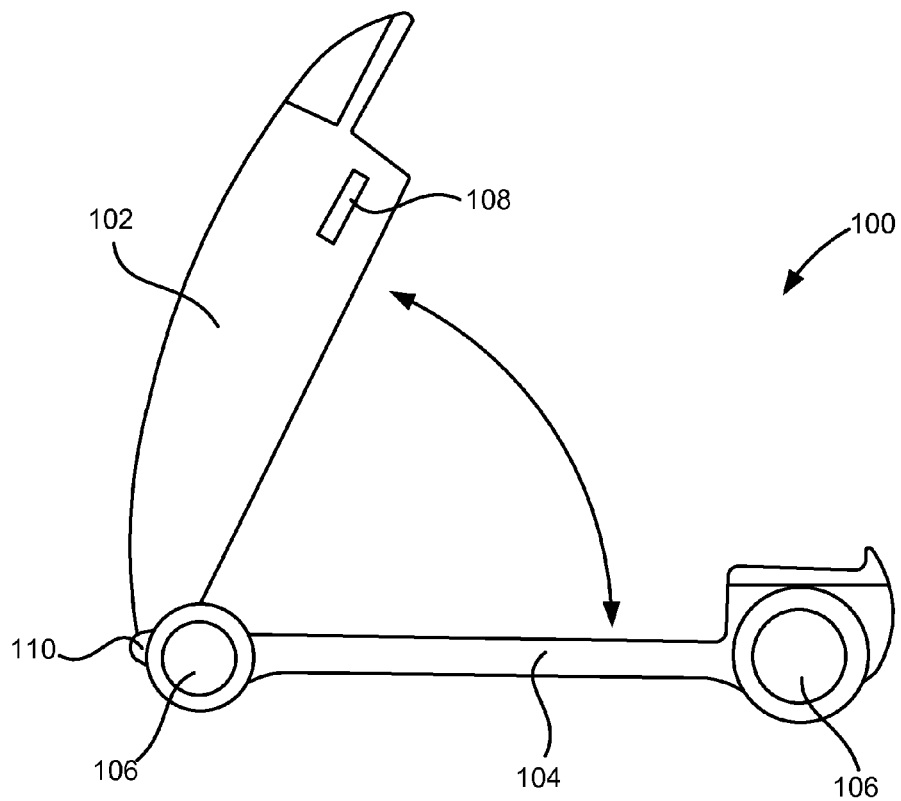
FIG. 1B depicts an exemplary embodiment of a golf bag cart in an open configuration.

FIGS. 1A-1B depict an embodiment of a golf bag cart 100. The golf bag cart 100 can comprise a storage section 102, a drive section 104, a plurality of wheels 106, and/or a steering mechanism 108.

In some embodiments, the storage section 102 and drive section 104 can be hingeably coupled with one another, such that the storage section 102 and drive section 104 can be rotated toward or against each other about one or more hinges 110, as shown in FIG. 1B. By way of a non-limiting example, a hinge 110 can comprise an axle or rod extending through the storage section 102 and the drive section 104, such that the storage section 102 and drive section 104 can be moved independently about the axle of the hinge 110.

FIG. 1A depicts the golf bag cart 100 in a closed configuration, in which the storage section 102 is positioned against the drive section 104. FIG. 1B depicts the golf bag cart 100 in an open configuration, in which the storage section 102 is in an upright position rotated away from the drive section 104. In some embodiments, the hinge 110 can be positioned at the front of golf bag cart 100, such that when the golf bag cart 100 is in the open configuration the storage section 102 can extend away from the hinge 110 above the front of the drive section 104 as shown in FIG. 1B.

In some embodiments, the hinge 110 and/or other components of the golf bag cart 100 can lock into position when the golf bag cart 100 is in the open configuration or closed position, such that the golf bag cart 100 can be maintained in the desired configuration until released and moved into the other configuration. In some embodiments, the hinge 110 and/or other components of the golf bag cart 100 can be spring loaded or be otherwise configured to tend toward a particular configuration. By way of a non-limiting example, the hinge 110 can be spring loaded to tend towards the open position to assist in moving the storage section 102 away from the drive section 104 and into the open position.

In some embodiment the storage section 102 and/or drive section 104 can be manually moved between the open configuration and closed configuration by a user. In other embodiments, the hinge 110 and/or other components of the golf bag cart 100 can be motorized or mechanized to automatically move the golf bag cart 100 back and forth between the open configuration and closed configuration. By way of a non-limiting example, in some embodiments a user can press a button or activate a remote control to convert the golf bag cart 100 from the closed configuration to the open configuration or vice versa.

In some embodiments, the overall size of the golf bag cart 100 in the closed configuration can be substantially similar to the size of a conventional golf bag, such that when the golf bag cart 100 is in the closed configuration it can be fit into the trunk of an automobile for transport or storage. In alternate embodiments, the overall size of the golf bag cart 100 in the closed configuration can be larger or smaller than the size of a conventional golf bag.

Figure 2:
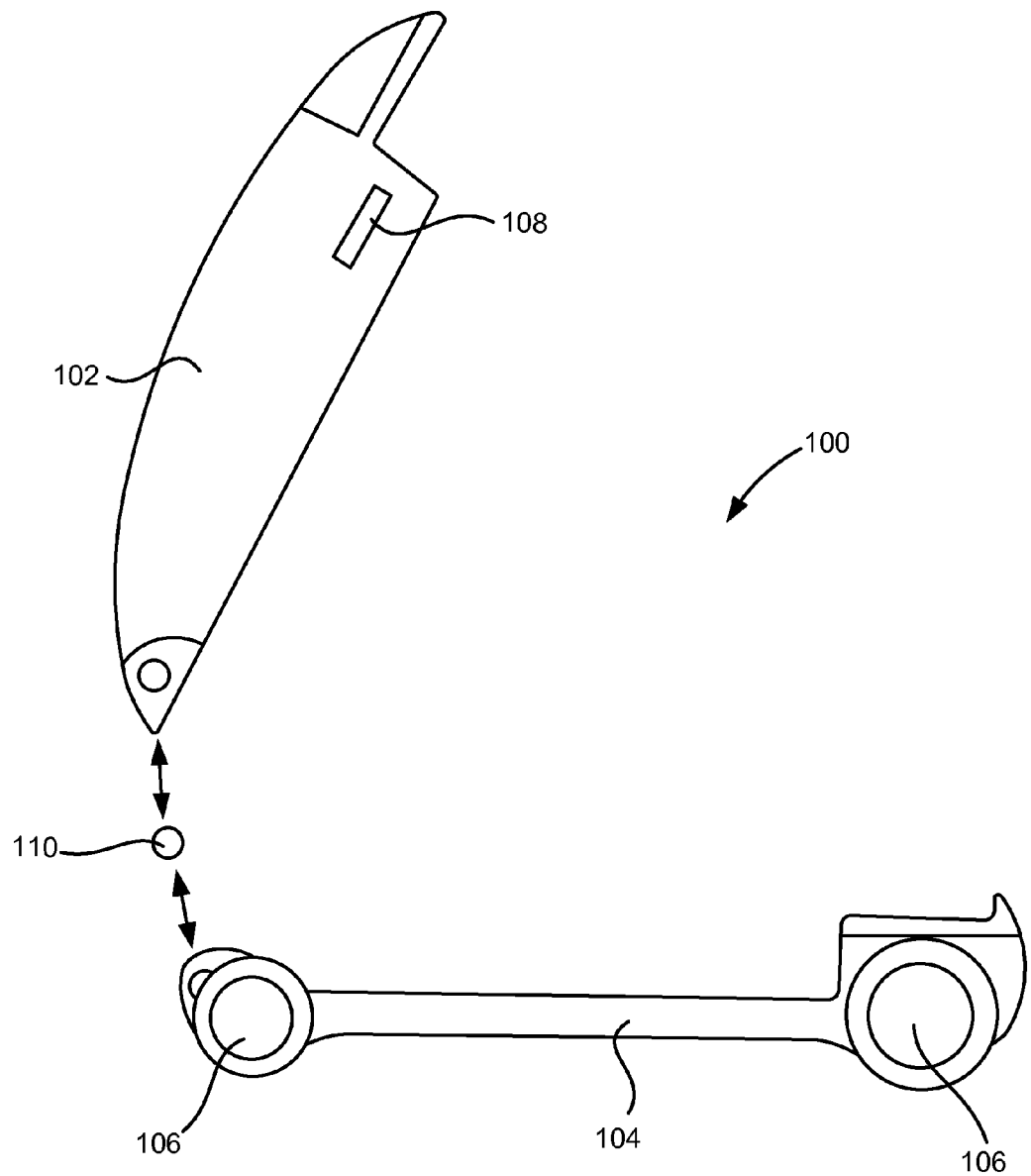
FIG. 2 depicts an exemplary embodiment of a golf bag cart with a selectively removable storage section.

In some embodiments, the storage section 102 and drive section 104 can be permanently coupled via the hinge 110. However, in alternate embodiments the storage section 102 and drive section 104 can be coupled such that they are selectively removable from one another, so that the storage section 102 can be carried or transported separately from the drive section 104 if desired. By way of a non-limiting example, in some embodiments a rod or axle can be removed from the from the hinge 110 to uncouple the storage section 102 from the drive section 104, as shown in FIG. 2.

Figure 3:
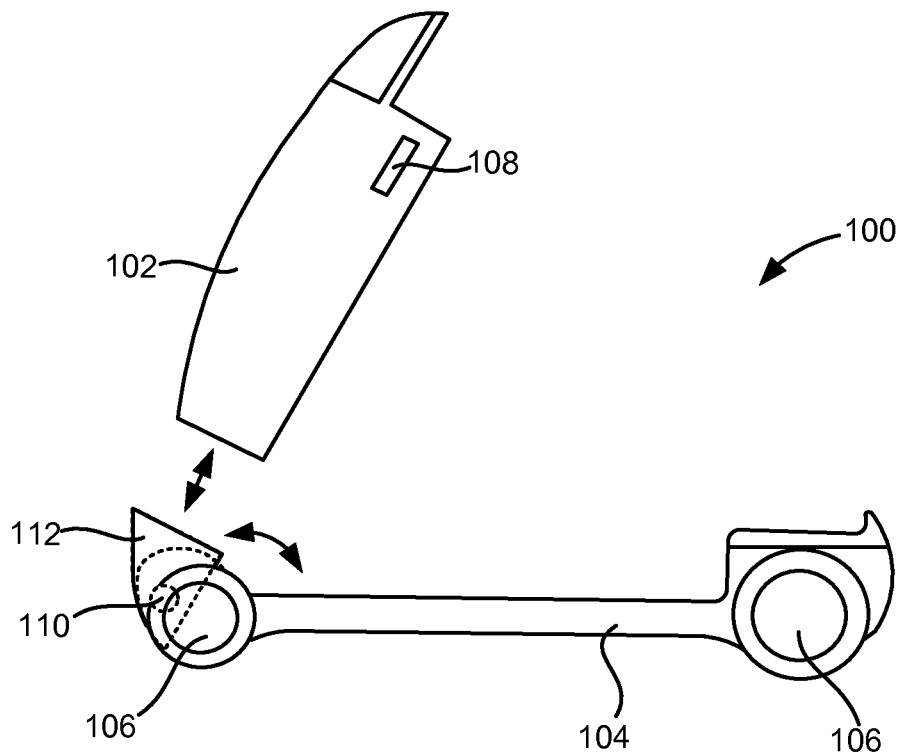
FIG. 3 depicts an exemplary embodiment of a golf bag cart with a swivel mount.
Figure 4:
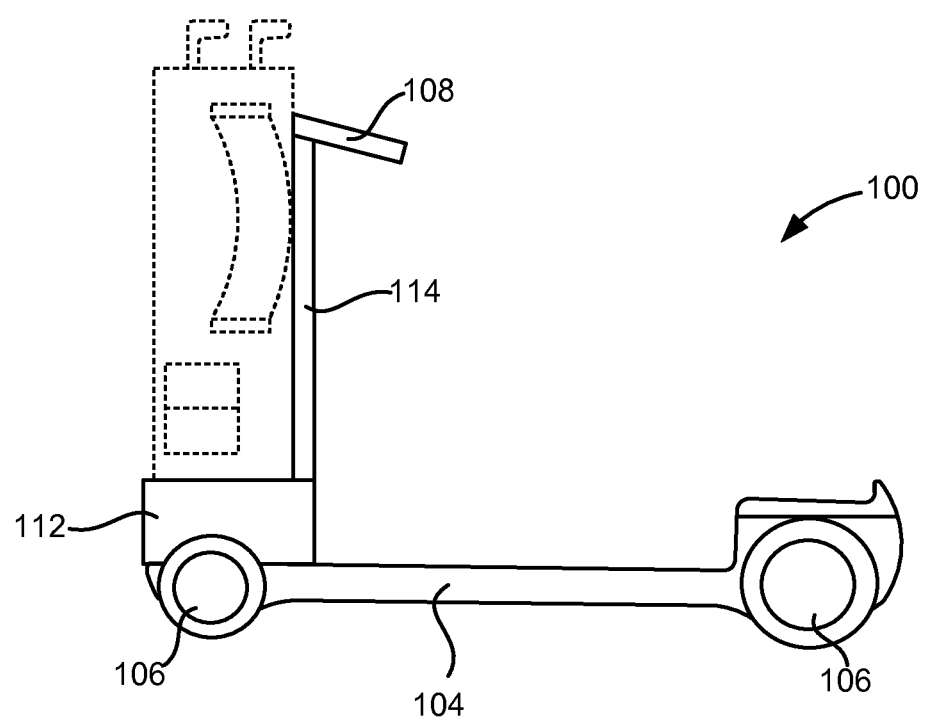
FIG. 4 depicts an exemplary embodiment of a golf bag cart with a fixed mount.

In still other embodiments, as shown in FIGS. 3 and 4, the golf bag cart 100 can comprise a mount 112 coupled with the drive section 104. The mount 112 can be configured to receive or be selectively attached to a storage section 102 and/or a conventional golf bag, such that the storage section 102 or golf bag can rest on or be coupled with the mount 112. As shown in FIG. 3, in some embodiments the mount 112 can be hingeably coupled with the drive section 104, such that the mount 112 and a mounted storage section 102 or golf bag can be rotated or swiveled relative to the drive section 104 to move the golf bag cart 100 between an open configuration and a closed configuration. In other embodiments, as shown in FIG. 4, the mount 112 can be fixed to accept a storage section 102 or conventional golf bag in a substantially upright and/or angled position, such that the drive section 104 and mounted storage section 102 or golf bag appears similar to the open configuration shown in FIG. 1B. In some embodiments in which the mount 112 is configured to accept a conventional golf bag, the mount 112 or drive section 104 can have an extension 114 that extends away from the drive section 104 and has a steering mechanism 108 at or near the top of the extension 114, as shown in FIG. 4.

The storage section 102, drive section 104, mount 112, and/or extension 114 can each comprise bodies and/or shells made of plastic, fiberglass, metal, and/or any other suitable material.

Figure 5A:
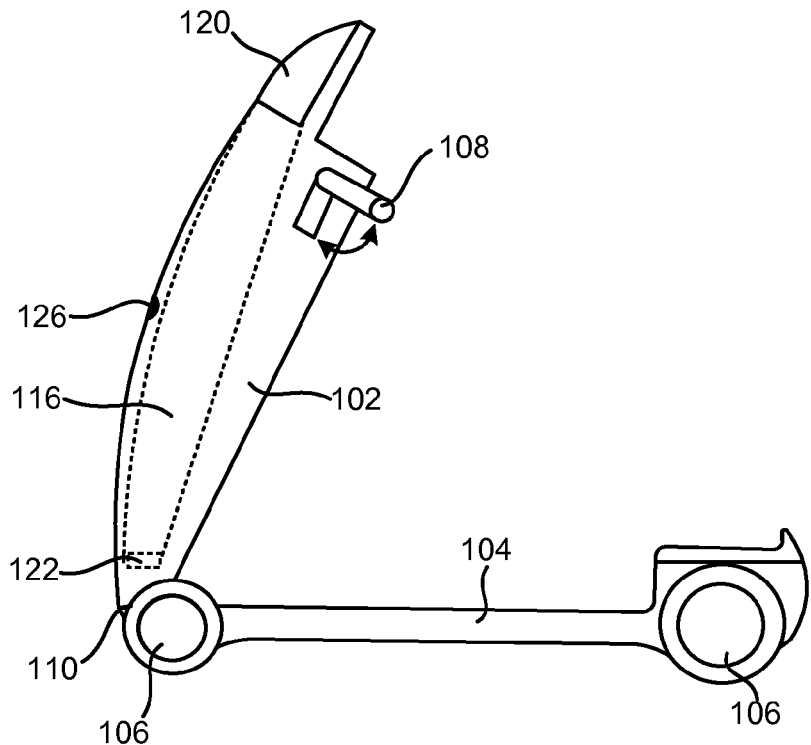
FIGS. 5A-5B depicts the golf bag compartments of an exemplary embodiment of a golf bag cart.
Figure 5B:
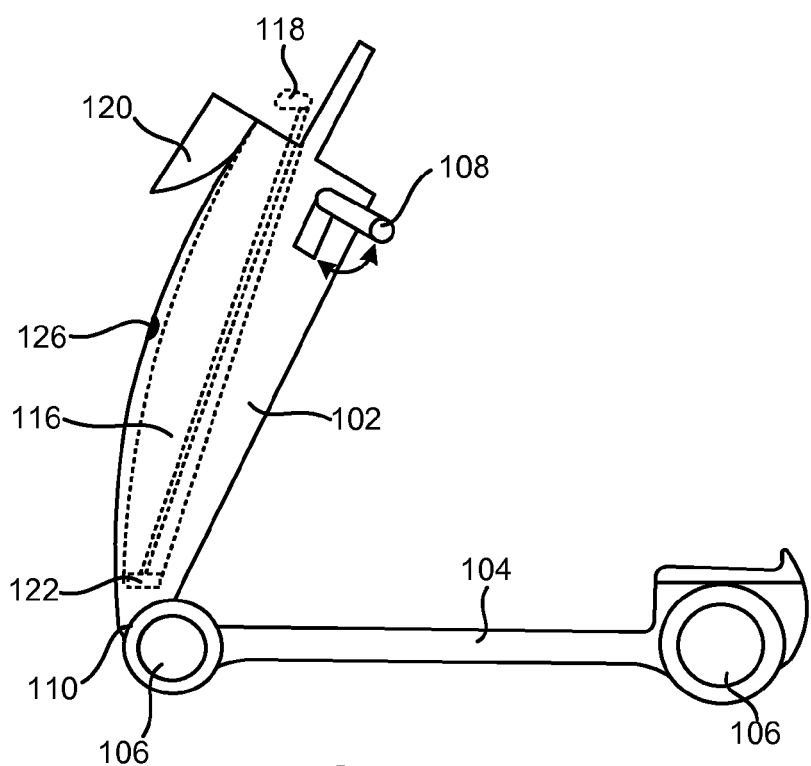

As shown in FIGS. 5A and 5B, the storage section 102 can be at least partially hollow and define one or more golf club storage compartments 116 within the interior of the storage section 102. The storage section 102 can have one or more slots, openings, or other apertures that open into the interior of the golf club storage compartments 116, such that golf clubs 118 can be inserted into the golf club storage compartments 116, as shown in FIG. 5B. Each golf club storage compartment 116 can be large enough to partially or fully enclose one or more golf clubs 118 within the storage section 102.

In some embodiments, the storage section 102 can comprise a covering 120 that can selectively enclose the golf club storage compartment 116. In some embodiments, the covering 120 can be hingeably coupled with the storage section 102, such that the covering 120 can be rotated to selectively expose or cover the opening into the interior of the golf club storage compartment 116. In other embodiments, the covering 120 can be removable from the storage section 102, be configured to slide down the side of the storage section 102, and/or be otherwise moveable to selectively uncover the opening into the interior of the golf club storage compartment 116. By way of a non-limiting example, FIG. 5A depicts a covering 120 enclosing the opening of a golf club storage compartment 116, while FIG. 5B depicts the covering 120 rotated away from the opening of the golf club storage compartment 116, thereby allowing golf clubs 118 to be inserted into or removed from the golf club storage compartment 116. In alternate embodiments, a golf club storage compartment 116 can be a drawer or other compartment that can be rotated out of, slid out of, or removed from the rest of the storage section 102.

In some embodiments, a golf club storage compartment 116 can comprise one or more sensors 122 that can detect the presence and/or absence of a golf club 118 within the golf club storage compartment 116. By way of a non-limiting example, in some embodiments the sensor 122 can be a pressure sensor located at the base of a golf club storage compartment 116, such that the pressure sensor can detect when a golf club 118 has been removed from the golf club storage compartment 116 and the golf bag cart 100 can alert a user through an audible and/or visual notification that the golf club 118 is missing from the golf club storage compartment 116.

Figure 6:
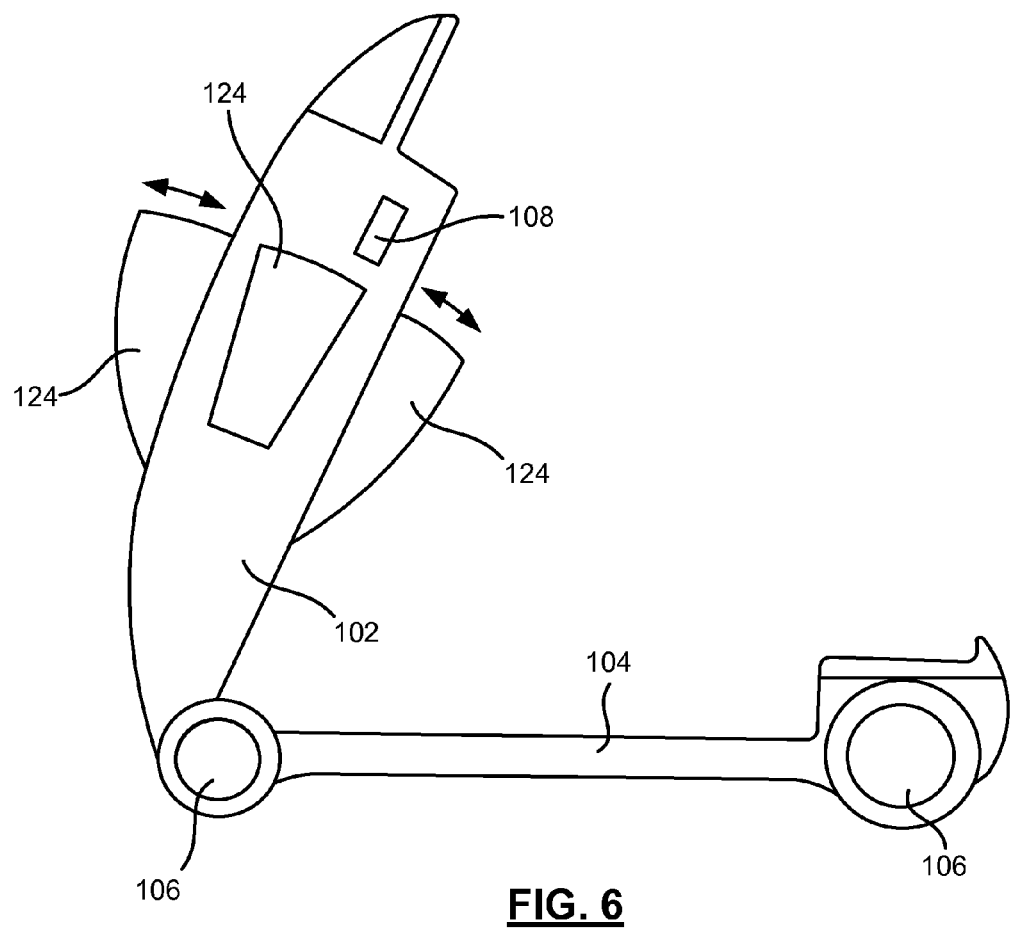
FIG. 6 depicts the storage compartments of an exemplary embodiment of a golf bag cart.

As shown in FIG. 6, the storage section 102 can also comprise one or more other storage compartments 124. The storage compartments 124 can be drawers, pockets, slots, indentations, cupholders, trays, and/or other type of storage space. In some embodiments, a storage compartment 124 can be stored within the interior of the storage section 102, and can be accessed by pulling or rotating the storage compartment 124 out from the body of the storage section 102. In other embodiments, a storage compartment 124 can be at least partially located within the interior of the storage section 102, and a door or flap can be opened to access the storage compartment 124. In still other embodiments, the storage compartment 124 can be on the exterior of the storage section 102, such as a mesh pocket coupled to the exterior of the storage section's shell or a cupholder molded into the shell of the storage section 102.

A user can store golf balls, tees, gloves, score cards, towels, food, beverages, and/or any other desired items in the storage compartments 124. In some embodiments, one or more storage compartments 124 can be insulated and/or cooled, such as a cooler or icebox configured to store and keep beverages cool.

The storage section 102, drive section 104, and/or extension 114 can comprise one or more steering mechanisms 108. The steering mechanisms 108 can at least partially control the direction, acceleration, and/or deceleration of one or more of the plurality of wheels 106. In some embodiments, the steering mechanisms 108 can be handlebars that extend from the storage section 102. In alternate embodiments, a steering mechanism 108 can be a steering wheel, joystick, pedals, and/or any other driving control mechanism. The steering mechanism 108 can comprise one or more throttles, levers, rotating grips, buttons, pedals, and/or other components that can at least partially control acceleration and/or deceleration of the golf bag cart 100.

In some embodiments, one or more steering mechanisms 108 can slide out or fold out from the sides of the storage section 102, as shown in FIG. 5A. By way of a non-limiting example, the golf bag cart 100 can have handlebars that can be extended or folded out from the storage section 102 when the golf bag cart 100 is in the open configuration and can be retracted or folded into the storage section 102 when the golf bag cart 100 is in the closed configuration. In alternate embodiments, one or more steering mechanisms 108 can be in a fixed position and/or be located at any other place on the golf bag cart 100.

In some embodiments, the golf bag cart 100 can comprise one or more cameras 126. In some embodiments, one or more cameras 126 can be positioned on the exterior of the storage section 102, such that the cameras 126 face forward when the golf bag cart 100 is in the open configuration as shown in FIGS. 5A-5B. The cameras 126 can be configured to take pictures and/or video. By way of a non-limiting example, a golfer can use the cameras 126 to record all or a portion of his or her golf game or an individual swing for later viewing and analysis.

In some embodiments, the golf bag cart 100 can further comprise one or more additional golf equipment devices. By way of a non-limiting example, the storage section 102 can comprise one or more rangefinders. A rangefinder can be a device configured to determine and/or track the distance to a pin or golf ball, such as a GPS rangefinder. By way of another non-limiting example, the storage section 102 can comprise a golf ball cleaner or washer.

Figure 7:
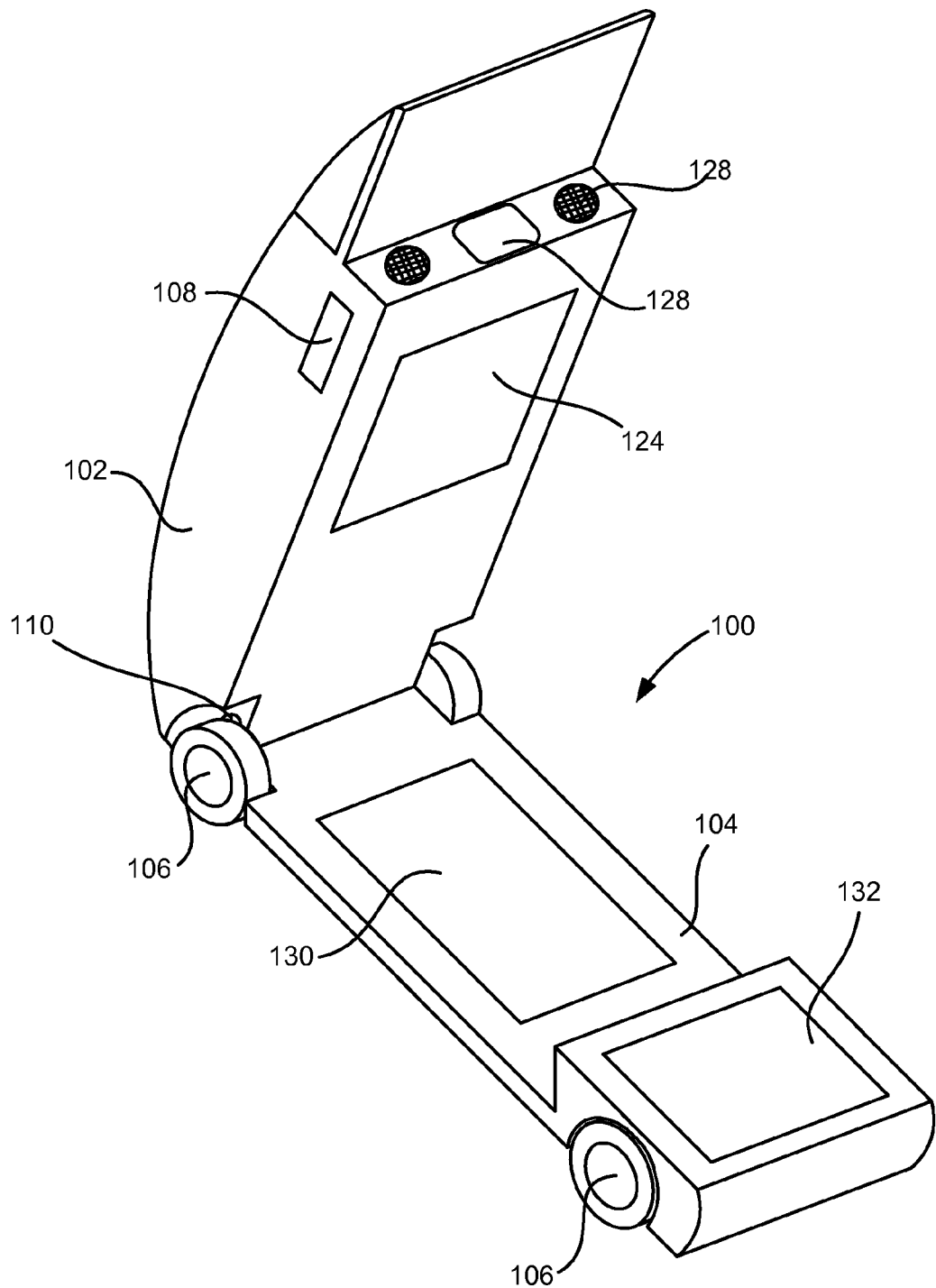
FIG. 7 depicts an exemplary embodiment of a golf bag cart in an open configuration with the top of a storage section visible.

In some embodiments, the golf bag cart 100 can further comprise one or more entertainment devices 128, such as speakers, CD players, radios, and/or docks for a mobile devices such as personal media players, mobile phones, or tablet computers. As shown in FIG. 7, in some embodiments entertainment devices 128 such as speakers and mobile device docks can be located towards the top of the storage section 102. In alternate embodiments, one or more entertainment devices 128 can be located at any other position on the storage section 102 and/or drive section 104.

The drive section 104 can be a platform coupled with a plurality of wheels 106. As discussed above, in some embodiments the drive section 104 can be hingeably coupled with the storage section 102. In alternate embodiments, the drive section 104 can be removably coupled with the storage section 102 and/or a conventional golf bag.

In some embodiments, the drive section 104 can comprise an aluminum base frame surrounded by an outer shell made of plastic and/or fiberglass. In other embodiments, the drive section 104 can comprise any other desired material or combination of materials. In some embodiments, the drive section 104 can be substantially the same length and width as the storage section 102, as shown in FIG. 7. In other embodiments, the drive section 104 and storage section 102 can have different lengths and/or widths.

The wheels 106 can be rotatably coupled with the drive section 104. By way of a non-limiting example, in some embodiments an axle can extend from each wheel to the drive section 104. In some embodiments, the wheels 106 can be solid wheels comprised of metal, plastic, resin, or any other desired material. In other embodiments, the wheels 106 can comprise an inner rim surrounded by a tire. By way of a non-limiting example, the inner rim can be metal while the tire can be rubber. In some embodiments, brakes can be coupled with the wheels 106 and/or axles and can be configured to slow down and stop the rotation of the wheels 106. In some embodiments, one or more wheels 106 can be swiveled relative to the drive section 104, such that swiveling the wheels 106 while the golf bag cart 100 is in motion can steer the golf bag cart 100.

In some embodiments, the golf bag cart 100 can comprise one or more batteries 130. The batteries 130 can be rechargeable traction batteries such as lithium-ion batteries, lead-acid batteries, nickel metal hydride batteries, or sodium zebra batteries, or any other type of battery. As shown in FIG. 7, in some embodiments one or more batteries 130 can be housed in a substantially planar portion of the drive section 104 between the front and rear of the drive section 104. In other embodiments the batteries 130 can be located at any other suitable position in the drive section 104 or storage section 102. The golf bag cart 100 can comprise one or more charging mechanisms configured to charge the batteries 130, such as power plugs or solar panels.

The drive section 104 can comprise one or more motors 132. As shown in FIG. 7, in some embodiments a motor 132 can be housed at the rear of the drive section 104 in a raised portion near one or more rear wheels 106. In alternate embodiments, a motor 132 can be located at any other suitable position in the drive section 104 or storage section 102. In some embodiments, the motors 132 can be electrically coupled with the batteries 130, such that the batteries 130 provide power to the motors 132. In alternate embodiments, the motors 132 can be gas powered, be powered by hydrogen fuel cells, or be powered by any other type of power source.

The motors 132 can be coupled with and control one or more of the wheels 106. By way of a non-limiting example, in some embodiments a motor 132 can be coupled with a drive axle coupled with one or more rear wheels 106 via a direct gearing transmission. In alternate embodiments, the motor 132 can be coupled with one or more wheels 106 via drive belts, chains, or any other drive mechanism.

At least one of the wheels 106 can be powered and driven by the motor 132, and at least one of the wheels 106 can be swiveled and/or controlled by the steering mechanism 108. By way of a non-limiting example, in some embodiments the motor 132 can drive the rear wheels 106, and the steering mechanism 108 can be operated to swivel the front wheels 106. In some embodiments, the wheels 106 can be freewheeling when not driven by the motor 132, such that the golf bag cart 100 can be rolled manually in the event of a dead battery 130, failed motor 132, or any other drive failure.

In some embodiments, the golf bag cart 100 can comprise a set of two wheels 106 at the front of the drive section 104 and a set of two wheels 106 at the back of the drive section 104, as shown in FIG. 7. In other embodiments, the golf bag cart 100 can comprise three wheels 106, with one wheel 106 at the front or back end of the golf bag cart 100, and two wheels 106 at the opposing end. In still other embodiments, the golf bag cart 100 can comprise two wheels 106, one at the front end and one at the back end, and the golf bag cart 100 can further comprise a kickstand to stabilize and keep the golf bag cart 100 upright when not in motion. In yet other embodiments, the golf bag cart 100 can comprise any desired number of wheels 106 arranged in any desired position on the golf bag cart 100.

In some embodiments, one or more wheels 106 can be larger than other wheels 106. By way of a non-limiting example, in some embodiment the rear set of wheels 106 can be larger than the front set of wheels 106. In other embodiments, all wheels 106 can be the same size.

Figure 8:
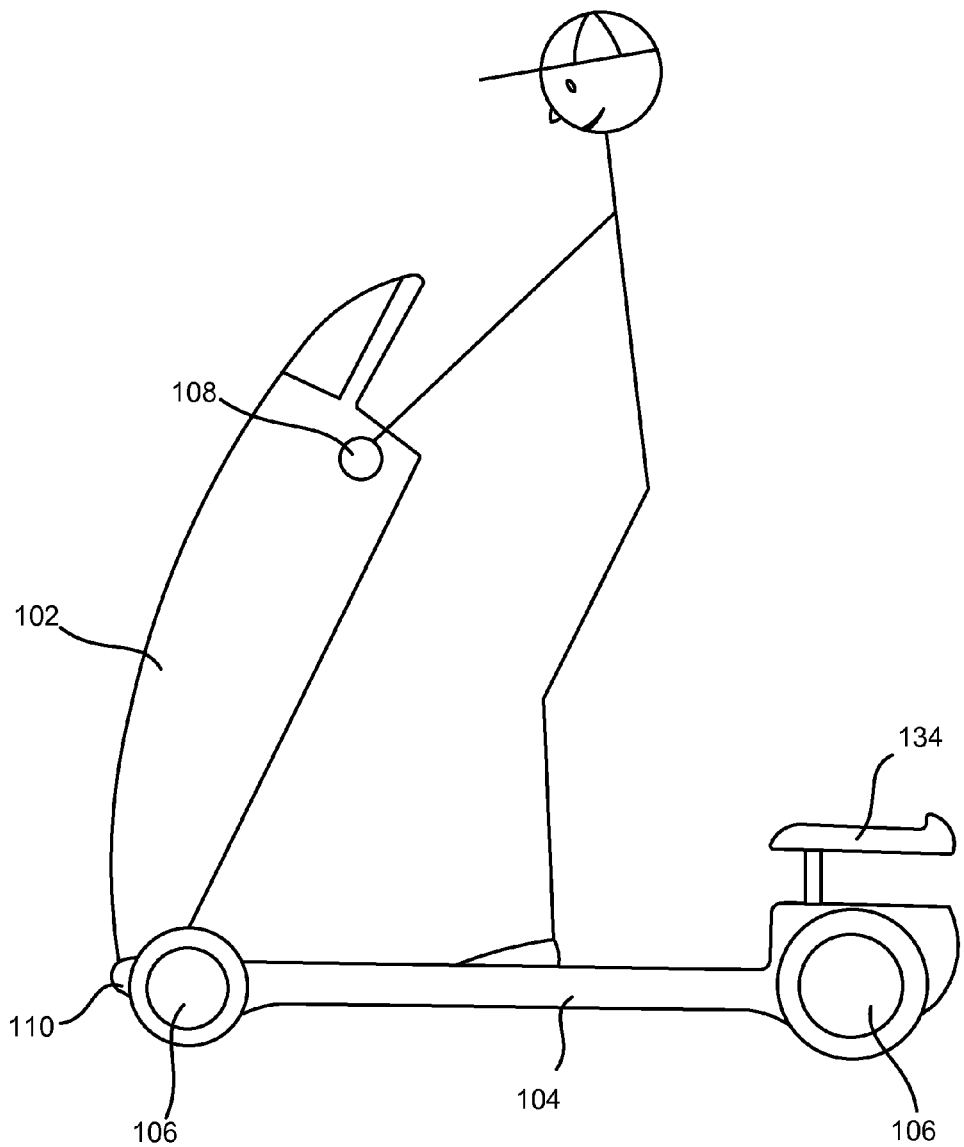
FIG. 8 depicts an exemplary embodiment of a golf bag cart in use.

In some embodiments, the drive section 104 can comprise a seat 134, as shown in FIG. 8. In some embodiments the seat 134 can be selectively flipped up or extended from the drive section 104. By way of a non-limiting example, as shown in FIG. 8, in some embodiments a user can extend or retract a seat 134 from a rear portion of the drive section 104. In some of these embodiments a user can adjust the height of the seat 134.

In use, a user can transport the golf bag cart 100 to a golf course or other desired location in the closed position shown in FIG. 1A. The user can flip up the storage section 102 about the hinge 110 into the open position shown in FIG. 1B. In alternate embodiments a user can couple a removable storage section 102 with the drive section 104 or mount 122 as shown in FIGS. 2-3, or mount a conventional golf bag on the drive section 104 or mount 122 as shown in FIG. 4.

A user can stand on the drive section 104 at a desired location as shown in FIG. 8, and/or sit on the seat 134. The user can operate the steering mechanism 108 to drive the golf bag cart 100 around the golf course or any other location. In some embodiments, the motor 132 and/or one or more wheels 106 can be controlled by the steering mechanism 108 to drive the golf bag cart 100. However, in alternate embodiments the motor 132 can be absent and the golf bag cart 100 can be propelled manually by a user by pushing a foot off the ground adjacent to the golf bag cart 100, similar to the operation of a push or kick scooter.

During a round of golf, when a user desires to hit a golf ball the user can drive the golf bag cart 100 to the ball's location, stop the golf bag cart 100, and select a golf club 118 from a golf club storage compartment 116. The user can replace the golf club 118 into the golf club storage compartment 116 and continue driving the golf bag cart 100. At any time, the user can also access any other item stored in any of the storage compartments 124, and/or operate any other components of the golf bag cart 100 such as cameras 126, entertainment devices 128, or other golf equipment devices.

When the user is finished with the golf bag cart 100, the user can return the golf bag cart 100 to the closed position shown in FIG. 1A for storage or transport. In other embodiments, such as those shown in FIGS. 2-4, the storage section 102 or conventional golf bag can be removed from the rest of the golf bag cart 100.

In some embodiments, if the user fails to replace a golf club 118 into a golf club storage compartment 116 after removing the golf club 118, sensors 122 in the golf club storage compartment 116 can detect that a golf club 118 is missing and the golf bag cart 100 can alert the user through an audible, visible, or any other type of notification. In some embodiments, sensor notifications can be suppressed when the golf bag cart 100 is stationary but be activated when the golf bag cart 100 is driven, such that the user can be alerted when he or she attempts to drive away from a parking spot without a golf club 118 that was removed from the golf bag cart 100 while the golf bag cart 100 was parked.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A golf bag cart, comprising;
a storage section defining a golf club storage compartment configured to accept one or more golf clubs;
a drive section coupled with said storage section, said drive section comprising a platform configured to support a rider;
a plurality of wheels rotatably coupled with said drive section; and
a steering mechanism coupled with said storage section and at least one of said plurality of wheels, such that said steering mechanism is configured to control said at least one of said plurality of wheels when the golf bag cart is driven,
wherein said storage section is hingeably coupled with said drive section such that said storage section is configured to be moved selectively between a closed position in which said storage section is next to said drive section, and an open position in which said storage section is at least partially upright relative to said drive section and said platform is configured to accept a rider.

2. The golf bag cart of claim 1, further comprising a motor housed in said drive section, said motor being coupled with at least one of said plurality of wheels such that said at least one of said plurality of wheels is powered by said motor.

3. The golf bag cart of claim 2, further comprising a battery housed in said drive section, said battery being coupled with said motor to power said motor.

4. The golf bag cart of claim 3, wherein said battery is a rechargeable traction battery.

5. The golf bag cart of claim 1, wherein said storage section is selectively removable from said drive section.

6. The golf bag cart of claim 1, wherein said steering mechanism is a handlebar that is selectively extendable from said storage section.

7. The golf bag cart of claim 1, wherein said storage section comprises a covering that selectively encloses an opening into an interior of said golf club storage compartment, such that enclosing said opening with said covering fully encloses said golf club storage compartment.

8. The golf bag cart of claim 1, wherein said storage section comprises a sensor configured to detect the presence and absence of a golf club within said golf club storage compartment.

9. The golf bag cart of claim 1, wherein said storage section further comprises one or more storage compartments.

10. The golf bag cart of claim 9, wherein at least one of said one or more storage compartments is a cooler.

11. The golf bag cart of claim 1, further comprising a camera coupled with said storage section.

12. The golf bag cart of claim 1, further comprising one or more entertainment devices coupled with said storage section.

13. The golf bag cart of claim 1, further comprising a seat configured to be extended from said drive section.

14. The golf bag cart of claim 1, wherein said storage section and said drive section have substantially the same length and width.

15. A golf bag cart, comprising;
a drive section comprising a platform configured to support a rider;
a plurality of wheels rotatably coupled with said platform;
a mount coupled with said drive section at a position on said platform proximate to an end of said platform; and
a storage section defining a golf club storage compartment configured to accept one or more golf clubs,
wherein said mount is configured to selectively accept and couple with said storage section such that said storage section is removable from said drive section.

16. The golf bag cart of claim 15, wherein said mount is hingeably coupled with said drive section, such that said mount is rotatable relative to said drive section.

17. The golf bag cart of claim 15, wherein said mount is in a fixed position relative to said drive section.

18. The golf bag cart of claim 15, wherein said storage section comprises a steering mechanism configured to control at least one of said plurality of wheels when said storage section is coupled with said mount and the golf bag cart is driven.

* * * * *